(12) United States Patent
Hecht

(10) Patent No.: US 7,887,266 B2
(45) Date of Patent: Feb. 15, 2011

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 364 days.

(21) Appl. No.: 12/167,268

(22) Filed: Jul. 3, 2008

(65) Prior Publication Data

US 2009/0035076 A1 Feb. 5, 2009

(30) Foreign Application Priority Data

Aug. 5, 2007 (IL) .................................... 185048

(51) Int. Cl.
*B26D 7/00* (2006.01)
*B23C 5/00* (2006.01)

(52) U.S. Cl. ........................................ 407/46; 407/113

(58) Field of Classification Search ................. 407/113, 407/61, 46, 41, 49, 94, 114, 115, 116, 30, 407/40
See application file for complete search history.

(56) References Cited

U.S. PATENT DOCUMENTS

| 3,629,919 | A | 12/1971 | Trevarrow |
| 4,315,706 | A | 2/1982 | Erkfritz |
| 5,947,648 | A | 9/1999 | Friedman |
| 7,090,443 | B2 | 8/2006 | Hecht et al. |
| 7,326,006 | B2 * | 2/2008 | Hecht et al. ................... 407/48 |
| 7,670,088 | B2 * | 3/2010 | Andersson et al. ........... 407/33 |
| 2006/0083594 | A1 | 4/2006 | Ejderklint |
| 2006/0120812 | A1 | 6/2006 | Hecht et al. |
| 2006/0216121 | A1 | 9/2006 | Edler et al. |
| 2009/0035075 | A1 * | 2/2009 | Hecht et al. ................. 407/104 |
| 2010/0104384 | A1 * | 4/2010 | Orlov et al. ................... 407/41 |

OTHER PUBLICATIONS

International Search Report PCT/IL2008/000938, dated Dec. 4, 2008.

* cited by examiner

*Primary Examiner*—Will Fridie, Jr.
(74) *Attorney, Agent, or Firm*—Womble Carlyle

(57) ABSTRACT

A cutting tool has a cutting insert retained in an insert pocket by a retaining screw. The rear surface of the cutting insert has an insert engaging element that comprises first insert rear abutment surfaces that are spaced apart and make an insert engaging angle with each other. The rear surface of the insert pocket has a pocket engaging element that comprises first pocket rear abutment surfaces that make a pocket engaging angle with each other. In a retained position, the first insert rear abutment surfaces abut the first pocket rear abutment surfaces, second insert rear abutment surfaces abut second pocket rear abutment surfaces and insert lower abutment surfaces abut pocket lower abutment surfaces.

35 Claims, 7 Drawing Sheets

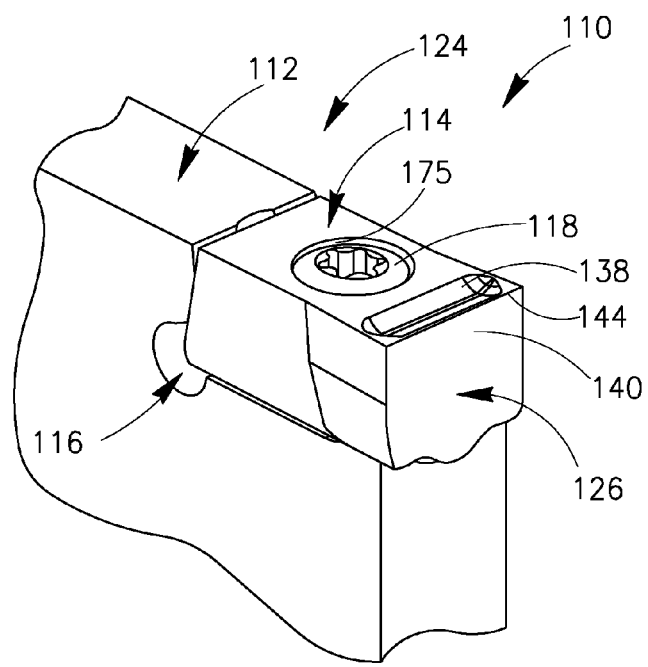
FIG.9
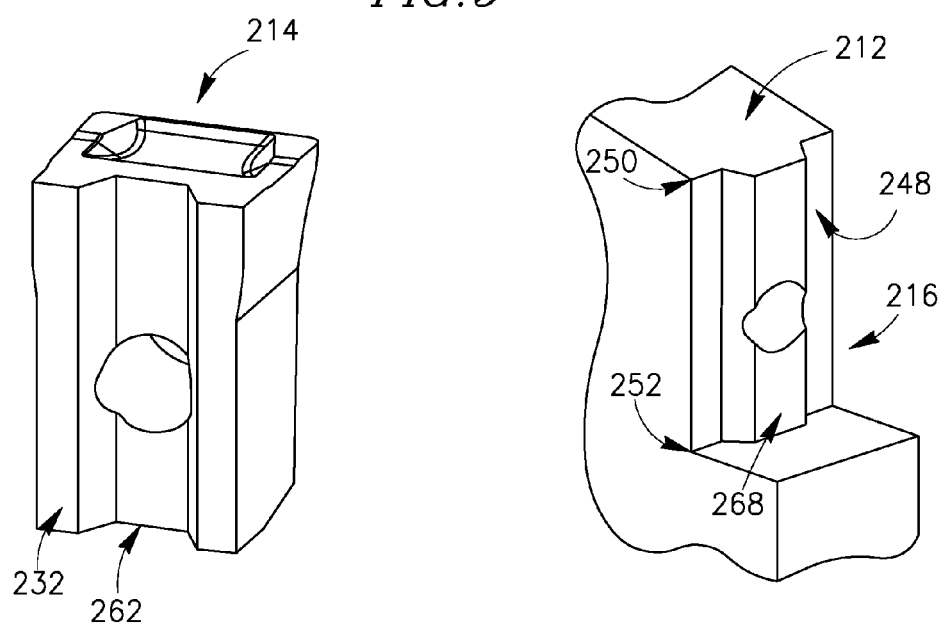
FIG.10
FIG.11

CUTTING TOOL AND CUTTING INSERT THEREFOR

FIELD OF THE INVENTION

The present invention relates to cutting tools of the type in which a cutting insert is retained in an insert pocket of a cutting tool by means of a retaining screw.

BACKGROUND OF THE INVENTION

In cutting tools for grooving, turning or parting-off, and in cutting tools for rotary slot cutting, a cutting insert is often retained in an insert pocket between two generally opposing jaws. In these tools, chips flowing from the cutting insert's cutting edge along its rake surface during a cutting operation may engage the jaw adjacent the rake surface and subject it to considerable abrasive wear. This disadvantageous effect will in time reduce the jaw's ability to retain the cutting insert within the insert pocket.

One solution which significantly overcomes this disadvantageous effect is disclosed in U.S. Pat. No. 5,947,648 to Friedman et al. A tool holder includes a holder blade having an upper jaw and a base jaw wherein the upper jaw is fitted with an exchangeable head material shield insert for protecting it against wear.

An improved solution is disclosed in U.S. Pat. No. 7,090,443 B2 to Hecht. A cutting insert is retained in an insert pocket of a cutting tool by means of a retaining screw. The lower surface of the cutting insert comprises a pair of insert lower faces which extend rearwardly from the forward surface at an external non-acute insert lower angle to each other. The lower abutment surface of the insert pocket comprises a pair of lower faces which extend forwardly from the pocket recess at an internal holder lower angle to each other. The internal holder lower angle is equal or slightly smaller than the external insert lower angle.

Lateral stability of the cutting insert relative to the insert holder is provided by the lower and rear surfaces of the cutting insert having generally V-shape concave (or convex) cross sections, which mate corresponding generally V-shape convex (or concave) cross sections of the lower and rear abutment surfaces of the insert pocket.

SUMMARY OF THE INVENTION

In accordance with the present invention there is provided a cutting insert comprising:

an insert upper surface and an insert lower surface forming insert end surfaces, and a peripheral surface extending between the insert end surfaces, the peripheral surface comprising:

opposing insert forward and rear surfaces and opposing insert side surfaces extending between the insert forward and rear surfaces, a through bore having a through bore axis A and extending between the insert forward and rear surfaces, a forward cutting edge formed at an intersection of the insert upper surface and the insert forward surface, the insert rear surface comprising, at a first portion thereof, an insert engaging element that extends in a direction between the end surfaces, the insert engaging element comprising two spaced apart first insert rear abutment surfaces, the first portion being located between the through bore and one of the insert end surfaces.

Typically, the first insert rear abutment surfaces make an insert engaging angle $\alpha$ with each other.

Further typically, the insert engaging angle $\alpha$ is obtuse.

Still further typically, the first insert rear abutment surfaces are planar.

If desired, the insert engaging element constitutes a protrusion that is located between the insert lower surface and the through bore.

Further if desired, the insert engaging element constitutes a protrusion that is located between the insert upper surface and the through bore.

Yet further if desired, the insert engaging element constitutes a recess that is located between the insert lower surface and the through bore.

Still yet further if desired, the insert engaging element constitutes a recess that is located between the insert upper surface and the through bore.

Typically, the cutting insert comprising two spaced apart second insert rear abutment surfaces at a second portion of the insert rear surface, the first and second portions of the insert rear surface being separated by the through bore.

If desired, the second insert rear abutment surfaces are co-planar.

Typically, the insert lower surface comprises two spaced apart insert lower abutment surfaces.

Further typically, the insert lower abutment surfaces are co-planar.

If desired, the through bore axis makes an acute insert axis angle $\theta$ with the insert rear surface in a side cross-section of the cutting insert.

Further if desired, the insert lower surface makes an acute insert base angle $\phi$ with the insert rear surface in a side cross-section of the cutting insert.

In accordance with a first embodiment of the present invention, the insert upper surface comprises a rake surface, the insert forward surface comprises a forward relief surface and the forward cutting edge is formed at an intersection of the rake surface and the forward relief surface.

In accordance with a second embodiment of the present invention, the insert forward surface comprises a rake surface, the insert upper surface comprises a forward relief surface and the forward cutting edge is formed at an intersection of the rake surface and the forward relief surface.

Further in accordance with the present invention there is provided a cutting tool comprising:

an insert holder having an insert pocket, the insert pocket comprising a pocket rear surface, a pocket lower surface adjacent the pocket rear surface and a threaded bore extending rearwardly from the pocket rear surface and having a threaded bore axis B, the pocket rear surface having a pocket first end and a pocket second end remote from the pocket first end, the pocket first and second ends are located at opposite sides of the threaded bore in a direction from the pocket lower surface to the through bore, wherein the pocket rear surface comprises at the pocket first end thereof a pocket engaging element that extends in a direction from the pocket first end to the pocket second end, the pocket engaging element comprises two spaced apart first pocket rear abutment surfaces, and a cutting insert in accordance with claim 1 seated in the insert pocket and retained by a retaining screw, and wherein the first insert rear abutment surfaces abut the first pocket rear abutment surfaces.

Typically, the first pocket rear abutment surfaces make a pocket engaging angle $\beta$ with each other.

Further typically, the pocket engaging angle $\beta$ is obtuse.

Typically, the second end of the pocket rear surface comprises two spaced apart second pocket rear abutment surfaces.

Further typically, the second pocket rear abutment surfaces are co-planar.

Still further typically, the pocket lower surface comprises two spaced apart pocket lower abutment surfaces.

Typically, the pocket lower abutment surfaces are co-planar.

If desired, the threaded bore axis makes an acute threaded bore angle δ with the pocket rear surface in a side cross-section of the insert pocket.

Further if desired, the pocket lower abutment surfaces make an acute pocket base angle γ with the pocket rear surface in a side cross-section of the insert pocket.

According to a first embodiment of the present invention, the insert engaging element constitutes a protrusion, the pocket engaging element constitutes a recess and the insert engaging angle α is equal to the pocket engaging angle β or slightly smaller therefrom.

According to a second embodiment of the present invention, the insert engaging element constitutes a recess, the pocket engaging element constitutes a protrusion and the insert engaging angle α is equal to the pocket engaging angle β or slightly larger therefrom.

Generally, the insert holder is a part of a rotary slot metal cutting tool.

Further generally, the insert holder is a part of a rectangular blade.

Still further in accordance with the present invention there is provided a cutting tool comprising:

an insert holder having an insert pocket, a cutting insert seated in the insert pocket and a retaining screw, the cutting insert comprising:

an insert upper surface and an insert lower surface forming insert end surfaces, and a peripheral surface extending between the insert end surfaces, the peripheral surface comprising:

opposing insert forward and rear surfaces and opposing insert side surfaces extending between the insert forward and rear surfaces, a through bore having a through bore axis A and extending between the insert forward and rear surfaces, a forward cutting edge formed at an intersection of the insert upper surface and the insert forward surface, the insert rear surface comprising, at a first portion thereof, an insert engaging element that extends in a direction between the end surfaces, the insert engaging element comprising two spaced apart first insert rear abutment surfaces, the first portion being located between the through bore and one of the insert end surfaces, the second end of the insert rear surface comprising two spaced apart second insert rear abutment surfaces, the insert lower surface comprising two spaced apart insert lower abutment surfaces, the insert pocket comprising a pocket rear surface, a pocket lower surface adjacent the pocket rear surface and a threaded bore extending rearwardly from the pocket rear surface and having a threaded bore axis B, the pocket rear surface having a pocket first end and a pocket second end remote from the pocket first end, the pocket first and second ends are located at opposite sides of the threaded bore in a direction from the pocket lower surface to the through bore, the pocket rear surface comprising at the pocket first end thereof a pocket engaging element that extends in a direction from the pocket first end to the pocket second end, the pocket engaging element comprising two spaced apart first pocket rear abutment surfaces, the second end of the pocket rear surface comprising two spaced apart second pocket rear abutment surfaces, the pocket lower surface comprising two spaced apart pocket lower abutment surfaces, wherein the retaining screw passes through the through bore of the cutting insert and threadingly engaging into the threaded bore, the first insert rear abutment surfaces abut the first pocket rear abutment surfaces, the second insert rear abutment surfaces abut the second pocket rear abutment surfaces, and, the insert lower abutment surfaces abut the pocket lower abutment surfaces.

BRIEF DESCRIPTION OF FIGURES

For a better understanding of the present invention and to show how the same may be carried out in practice, reference will now be made to the accompanying drawings, in which:

FIG. 9 is a perspective view of the cutting portion of another embodiment of a cutting tool according to the present invention;

FIG. 10 is a rear perspective view of another embodiment of a cutting insert according to the present invention;

FIG. 11 is a perspective view of another embodiment of an insert holder pocket for holding the cutting insert of FIG. 10;

DETAILED DESCRIPTION OF THE INVENTION

Figure 1:
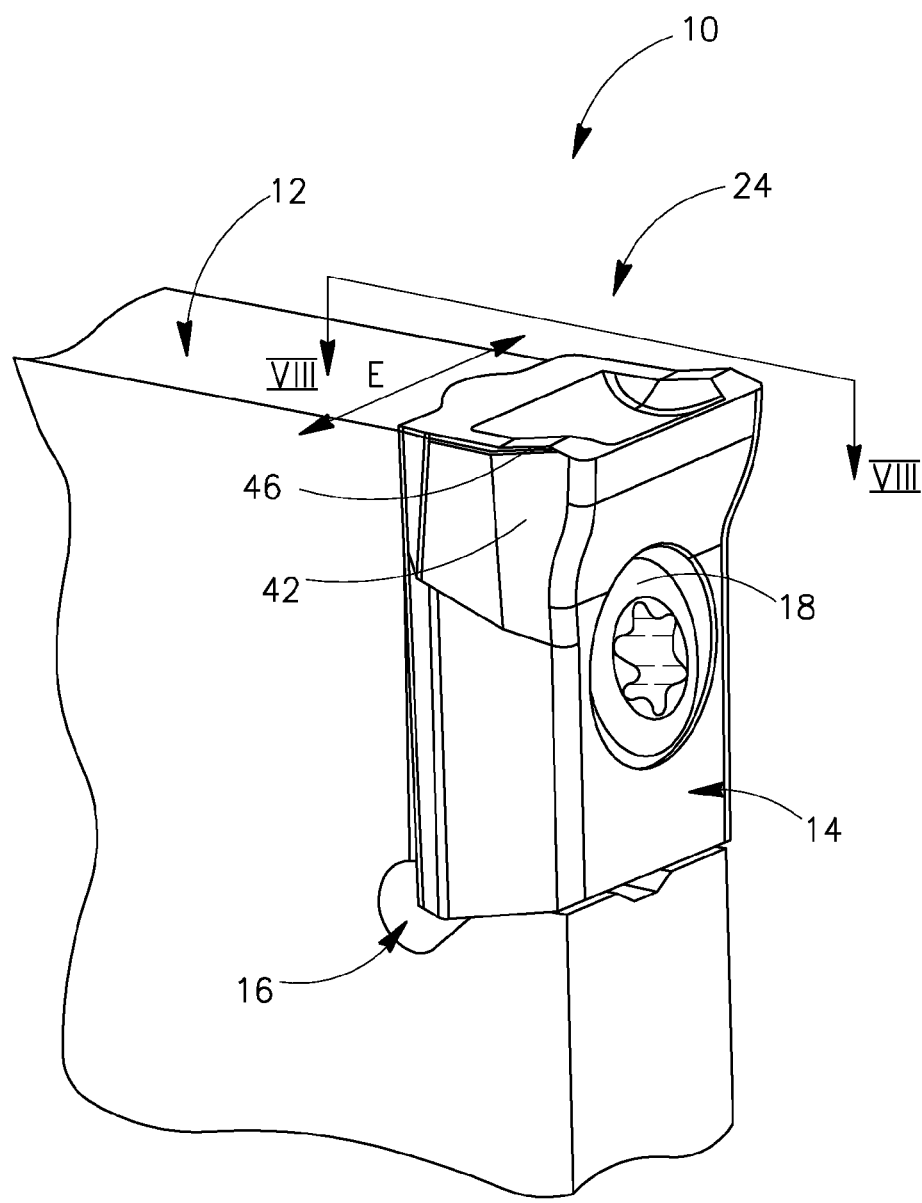
FIG. 1 is a perspective view of a cutting portion of a cutting tool in accordance with the present invention.

Attention is first drawn to FIG. 1 showing a cutting portion of a cutting tool 10 in accordance with the present invention. The cutting tool 10 may be used for metal cutting operations such as grooving, side turning and parting off. The cutting tool 10 comprises an insert holder 12 in the form of a rectangular blade with a cutting insert 14 retained in an insert pocket 16 by means of a retaining screw 18. The cutting insert 14 is typically manufactured by form-pressing and sintering carbide powders.

The cutting tool 10 comprises a cutting portion 24 which includes the cutting insert 14, the insert pocket 16, and the immediate vicinity of the insert holder 12 adjacent the insert pocket 16. It should be noted that directional terms appearing throughout the specification and claims, e.g. "forward", "rear", "upper", "lower" etc., are used as terms of convenience to distinguish the location of various surfaces relative to each other. These terms are defined with reference to FIGS.

1 to 14, however, they are used for illustrative purposes only, and are not intended to limit the scope of the appended claims.

Attention is drawn in addition to FIGS. 2 to 8. The cutting insert 14 comprises an insert upper surface 26, an insert lower surface 28 and a peripheral surface therebetween. The insert upper surface 26 and the insert lower surface 28 form insert end surfaces. The peripheral surface comprises an insert forward surface 30, an insert rear surface 32 opposing the insert forward surface 30 and opposing insert side surfaces 34 extending between the insert forward and rear surfaces 30, 32. A rake surface 38, over which chips cut from a workpiece flow, is located on the insert upper surface 26, a forward relief surface 40 is located on the insert forward surface 30 and a side relief surface 42 is located on each side surface 34. A forward cutting edge 44 is formed at the intersection of the rake surface 38 with the forward relief surface 40 and a side cutting edge 46 is formed at the intersection of the rake surface 38 with each side relief surface 42.

Figure 8:
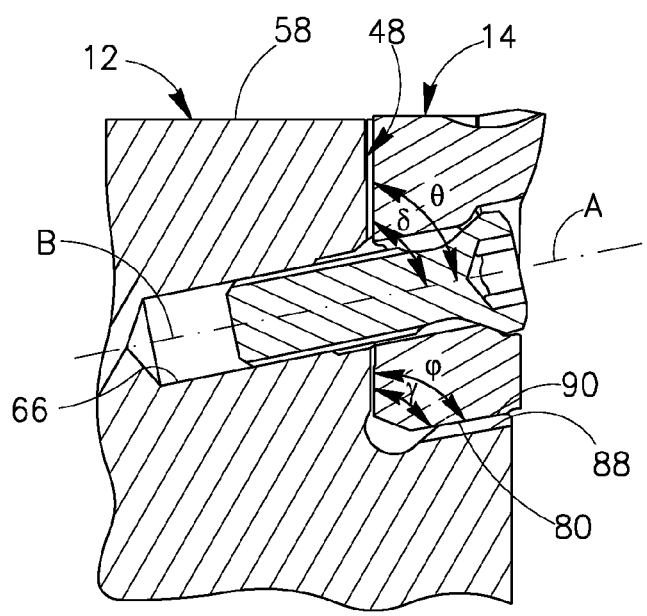
FIG. 8 is a cross-sectional view taken along line VIII-VIII in FIG. 1.

The cutting insert 14 has a first dimension D1 taken between extremities of the insert upper and lower surfaces 26, 28, a second dimension D2 taken between extremities of the insert forward and rear surfaces 30, 32, and, a third dimension D3 taken between extremities of the side surfaces 34 of the cutting insert 14. Typically, the first dimension D1 is larger than the second dimension D2 and larger than the third dimension D3. The cutting insert 14 is provided with a through bore 75, having a through bore axis A, that extends between the insert forward surface 30 and the insert rear surface 32. Preferably, as shown in FIG. 8, the through bore axis A makes an acute insert axis angle $\theta$ with the insert rear surface 32 as seen in a side cross-section of the cutting insert. Similarly, the insert lower surface 28 makes an acute insert base angle $\phi$ with the insert rear surface 32 as seen in a side cross-section of the cutting insert.

Figure 4:
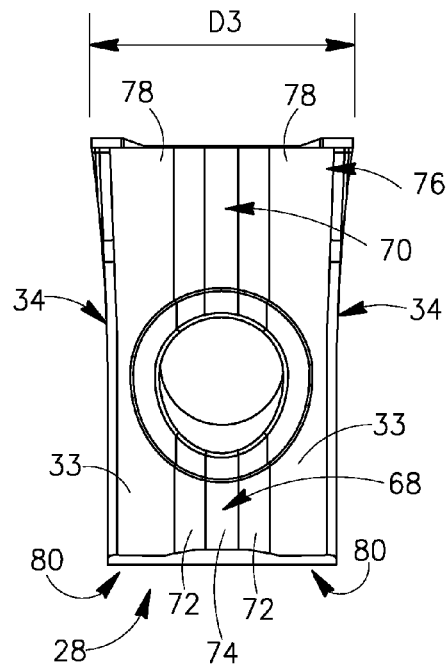
FIG. 4 is a rear view of the cutting insert of FIG. 2.

Referring to FIG. 4, the insert rear surface 32 is provided with an insert engaging element constituting a lower protrusion 68 and according to another embodiment of the present invention may be provided with an upper protrusion 70. The lower protrusion 68 protrudes rearwardly, extends in a direction between the end surfaces and is located between the insert lower surface 28 and the through bore 75. The upper protrusion 70 is located between the insert upper surface 26 and the through bore 75. The lower protrusion 68 is provided with first insert rear abutment surfaces 72 that are separated by an intermediate section 74. The intermediate section 74 may be a planar face and may be perpendicular to the through bore axis A of the through bore 75.

The first insert rear abutment surfaces 72 may be planar surfaces and may make an insert engaging angle $\alpha$ with each other. Typically, the insert engaging angle $\alpha$ may be in the range of 90° to 150°. The upper end 76 of the insert rear surface 32 has two spaced apart second insert rear abutment surfaces 78 that may be co-planar and may be separated by the upper protrusion 70. The insert lower surface 28 is provided with two spaced apart insert lower abutment surfaces 80 that may be co-planar.

The insert pocket 16 has a pocket rear surface 48 which extends between an upper end 50 and a lower end 52 thereof. The upper end 50 and the lower end 52 of the pocket rear surface 48 constitute pocket end surfaces. A threaded bore 66, having a threaded bore axis B, is formed in the rear surface 48 and extends rearwardly into the insert holder 12. The pocket rear surface 48 is connected at its lower end 52 via a pocket recess 54 to a pocket lower surface 56. The pocket recess 54 extends between side surfaces 55 of the insert holder 12. A holder upper surface 58 extends rearwardly from the upper end 50 of the pocket rear surface 48. The rear surface 48 has two spaced apart second pocket rear abutment surfaces 60 along an upper portion thereof distal the pocket lower surface 56 that are separated by a rear recess 62 constituting a pocket engaging element. The rear recess 62 extends from the threaded bore 66 to the pocket recess 54, and, according to another embodiment of the present invention may extend from the holder upper surface 58 to the threaded bore 66. The two second pocket rear abutment surfaces 60 may be co-planar.

The lower end 82 of the rear recess 62 proximal to the pocket recess 54 has two spaced apart first pocket rear abutment surfaces 84 that make a pocket engaging angle $\beta$ with each other. Typically, the pocket engaging angle $\beta$ may be in the range of 90° to 150°. In one embodiment, the insert engaging angle $\alpha$ is not greater than the pocket engaging angle $\beta$, i.e., is equal to the pocket engaging angle $\beta$ or slightly smaller therefrom. The first insert rear abutment surfaces 72 of the cutting insert 14 and the first pocket rear abutment surfaces 84 of the insert pocket 16 are related such that they prevent lateral movement of the cutting insert 14 with respect to the insert pocket 16 in a direction perpendicular to the insert holder side surfaces 55, as shown by the arrow E in FIG. 1.

The pocket lower surface 56 of the insert pocket 16 is separated by a lower recess 88 into two pocket lower abutment surfaces 90. As shown in FIG. 8, the pocket lower abutment surfaces 90 make a pocket base angle $\gamma$ with the pocket rear surface 48. Preferably, the pocket base angle $\gamma$ is acute since it provides a more stable seating of the cutting insert 14 in the insert pocket 16, than when the pocket angle $\gamma$ is non-acute, thus increasing the stability of the cutting tool 10. Similarly, the threaded bore axis B of the threaded bore 66 makes a threaded bore angle $\delta$ with the rear surface 48 of the insert pocket 16. Preferably, the angle $\delta$ is acute to enable increasing the wedging force by which the cutting insert 14 is seated within the insert pocket 16 thus, also, increasing the stability of the cutting tool 10.

Figure 5:
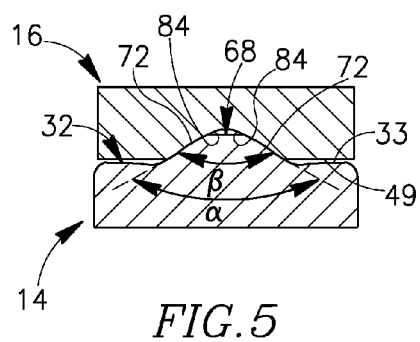
FIG. 5 is a cross-sectional view taken along line V-V in FIG. 3 with the cutting insert retained in the insert pocket.
Figure 6:
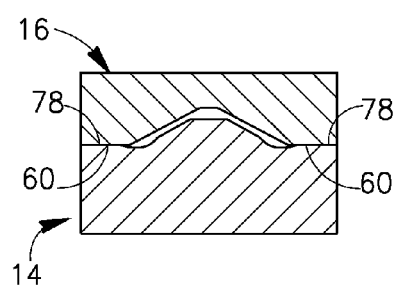
FIG. 6 is a cross-sectional view taken along line VI-VI in FIG. 3 with the cutting insert retained in the insert pocket.

As shown in FIGS. 5, 6 and 8, when the cutting insert 14 is securely retained in the insert pocket 16 with the retaining screw passing through the through bore 75 and screwed into the threaded bore 66 and fully tightened, then, the first insert rear abutment surfaces 72 of the cutting insert 14 abut the first pocket rear abutment surfaces 84 of the insert pocket 16, the second insert rear abutment surfaces 78 of the cutting insert 14 abut the second pocket rear abutment surfaces 60 of the insert pocket 16, and, the insert lower abutment surfaces 80 of the cutting insert 14 abut the pocket lower abutment surfaces 90 of the insert pocket 16.

FIG. 9 shows another embodiment of a cutting tool 110 according to the present invention. As shown, a cutting insert 114 is retained within an insert pocket 116 of an insert holder 112 by a retaining screw 118. The cutting insert 114 has a forward cutting edge 144 that is formed at the intersection of a rake surface 138 and a forward relief surface 140. In this embodiment, the forward relief surface 140 is found on an insert upper surface 126 and the through bore 175 of the cutting insert 114 is located at the same side of the cutting insert where the rake surface 138 is, whereby this side forms a part of the cutting section 124 of the cutting tool 110.

Figure 12:
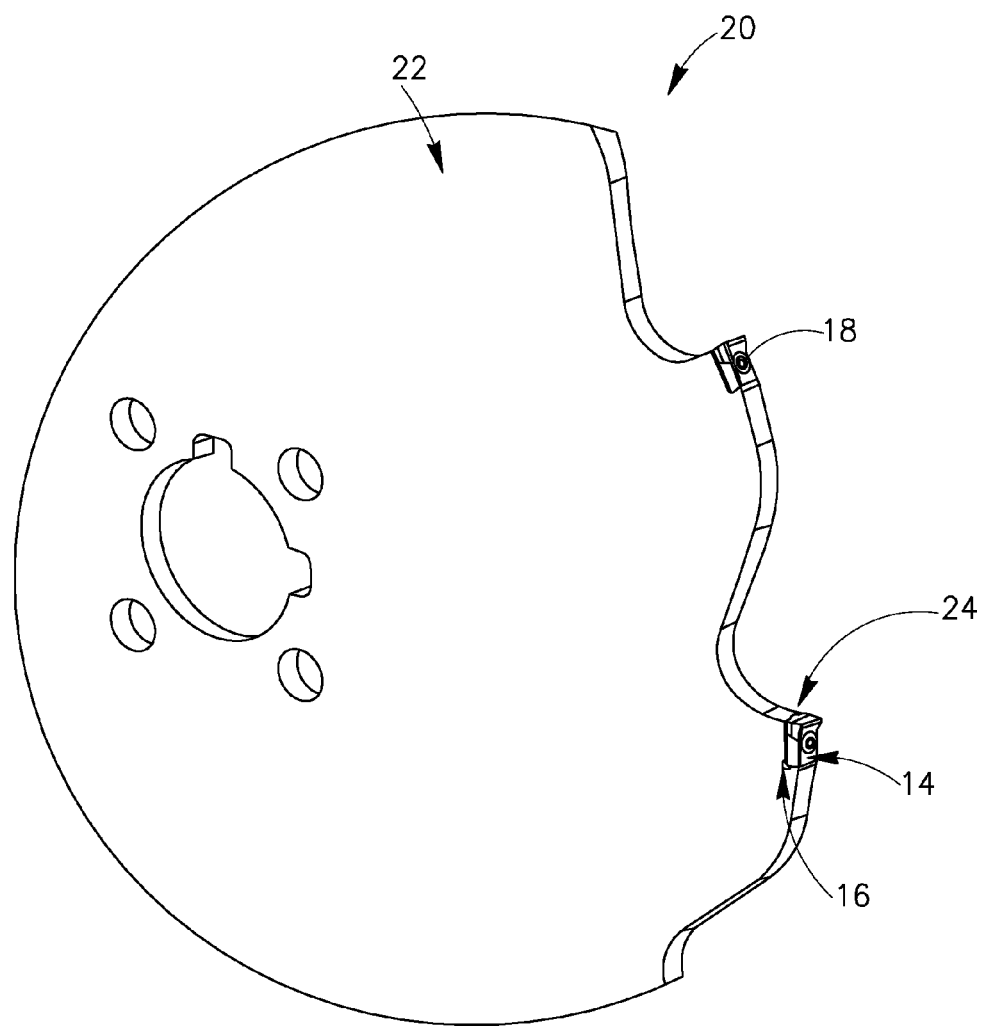
FIG. 12 is a partial perspective view of a cutting tool with the cutting portion of FIG. 1 in accordance with the present invention.

FIG. 12 shows a partial perspective view of a cutting tool 20 in accordance with the present invention that has the cutting portion of FIG. 1 and is used for rotary slot metal cutting operations. The cutting tool 20 comprises an insert holder 22 in the form of a circular disc with cutting inserts 14 retained in identical insert pockets 16 by means of retaining screws 18 and arranged around the periphery of the disc.

According to another embodiment of the present invention as shown in FIG. 10, the rear surface 232 of the cutting insert 214 does not have to be provided with a rearwardly extending protrusion, but, it can be formed with a recess 262 that extends in a direction from the upper surface of the cutting insert to the lower surface thereof. Similarly, as shown for the insert holder 212 in FIG. 11, the rear surface 248 of the insert pocket 216 does not have to be provided with a recess, but, it can be formed with a forwardly protruding protrusion 268 that extends in a direction from the lower end 252 of the rear surface 248 to the upper end 250 thereof.

Figure 13:
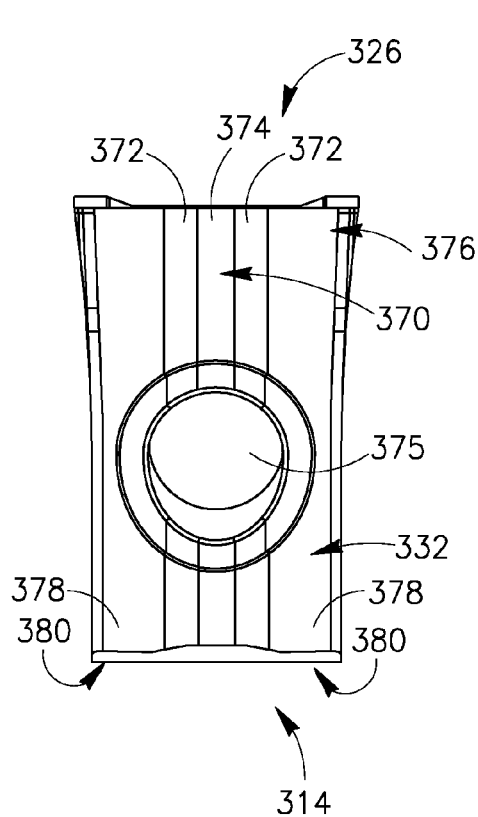
FIG. 13 is a rear view of another embodiment of a cutting insert according to the present invention.
Figure 14:
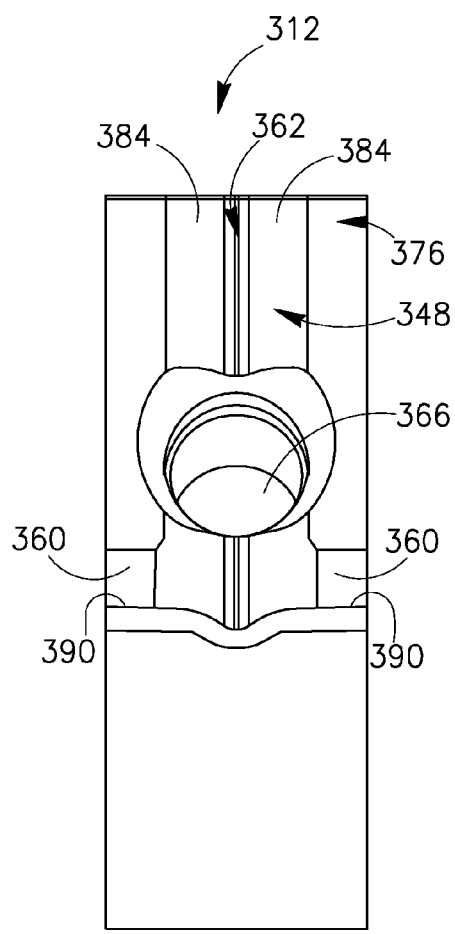
FIG. 14 is a front view of another embodiment of an insert holder according to the present invention for holding the cutting insert of FIG. 13.

FIGS. 13 and 14 show another embodiment of a cutting insert 314 and an insert holder 312 according to the present invention. As shown in FIGS. 13 and 14, the lower end of the insert rear surface 332 is provided with two spaced apart second insert rear abutment surfaces 378. The upper end 376 of the rear surface 332 is provided with an upper protrusion 370, constituting an insert engaging element, that is located between the insert upper surface 326 and the through bore 375. The upper protrusion 370 is provided with first insert rear abutment surfaces 372 that are separated by an intermediate section 374. The intermediate section 374 may be a planar face and may be perpendicular to the through bore axis A of the through bore 375. The first insert rear abutment surfaces 372 may be planar surfaces and may make an insert engaging angle α1 with each other. The insert engaging angle α1 is not specifically shown in the drawings and is similar to the insert engaging angle α shown in FIG. 5.

The insert pocket has a pocket rear surface 348. The upper portion of the pocket rear surface 348 is provided with a rear recess 362 that extends between the upper end 376 of the pocket rear surface 348 and the threaded bore 366. The upper end of the rear recess 362 has two spaced apart first pocket rear abutment surfaces 384 that make a pocket engaging angle β1 with each other. The pocket engaging angle β1 is not specifically shown in the drawings and is similar to the pocket engaging angle β shown in FIG. 5. The lower portion of the pocket rear surface 348 has two spaced apart second pocket rear abutment surfaces 360. Preferably, the second pocket rear abutment surfaces 360 are co-planar.

When the cutting insert is securely retained in the insert pocket with the retaining screw passing through the through bore, screwed into the threaded bore and fully tightened, then, the first insert rear abutment surfaces 372 abut the first pocket rear abutment surfaces 384, the second insert rear abutment surfaces 378 abut the second pocket rear abutment surfaces 360, and, the insert lower abutment surfaces 380 abut the pocket lower abutment surfaces 390 as already described above.

Figure 3:
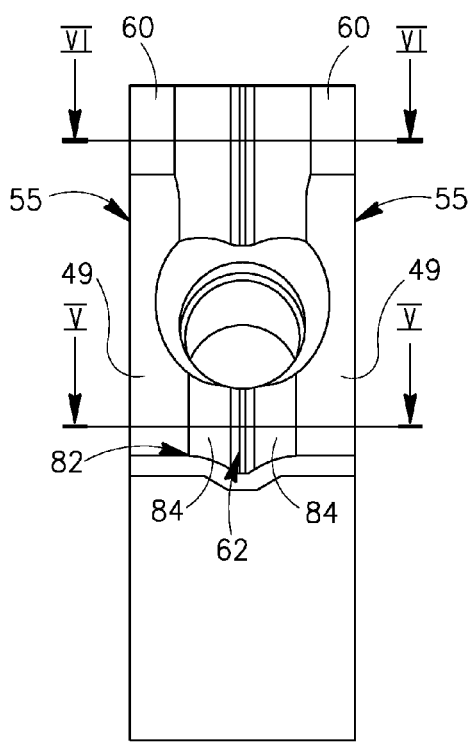
FIG. 3 is a front view of the insert holder of FIG. 2.

In the embodiments described herein, the protrusion and recess are spaced apart from the side surfaces of the associated cutting insert or insert holder. Thus, as seen in FIG. 4, the lower protrusion 68 with its first insert rear abutment surfaces 72 is spaced apart from the insert side surfaces 34 on either side by an insert rear non-abutment surfaces 33. Meanwhile, the upper protrusion 70 is spaced apart from the insert side surfaces 34 by the two second insert rear abutment surfaces 78. Similarly, as seen in FIG. 3, the lower end 82 of the pocket rear recess 62 with its first pocket rear abutment surfaces 84 is spaced apart from the insert holder side surfaces 55 by two spaced apart pocket rear non-abutment surfaces 49. Meanwhile, the upper end of the pocket rear recess 62 is spaced apart from the insert holder side surfaces 55 by the spaced apart second pocket rear abutment surfaces 60. As best seen in FIG. 5, in the assembled tool, the insert rear non-abutment surfaces 33 oppose and are spaced apart from the pocket rear non-abutment surfaces 49. In one embodiment, the recess 62 does not extend more than 80% of the width between the corresponding opposing side surfaces. Spacing apart the recess from the side surfaces in such a manner helps strengthen the corresponding insert holder. Similarly, when the recess is provided in the cutting insert, as shown for example in FIG. 10, then, spacing apart the recess from the side surfaces helps strengthen the cutting insert.

Figure 7:
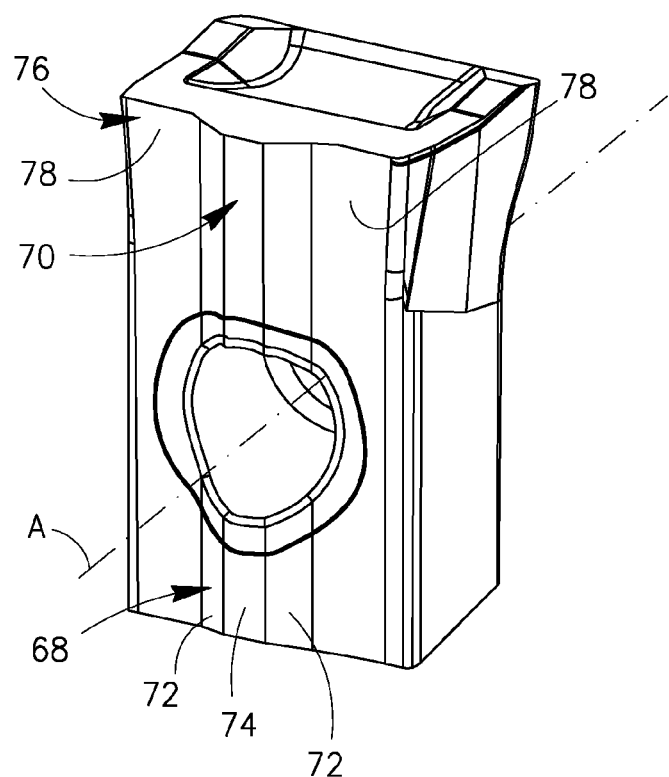
FIG. 7 is a rear perspective view of the cutting insert of FIG. 2.

Although the present invention has been described to a certain degree of particularity, it should be understood that various alterations and modifications could be made without departing from the spirit or scope of the invention as hereinafter claimed. For example, the protrusion in the rear surface of the cutting insert that constitutes the insert engaging element does not have to be limited, as described above, to extend between the through bore of the cutting insert and one of the cutting inserts' end surfaces. It can extend, as shown in FIGS. 4, 7 and 13, from one end surface to the through bore and from the through bore to the other end surface. However, in such a case, despite the fact that an engaging element extends on both sides of the through bore, it may include first insert rear abutment surfaces, as denoted by the numerals 72 on FIGS. 4 and 7 and numerals 372 on FIG. 13, on only one side, i.e., on a protrusion that extends from the through bore, at one side thereof, towards the near end surface.

Figure 2:
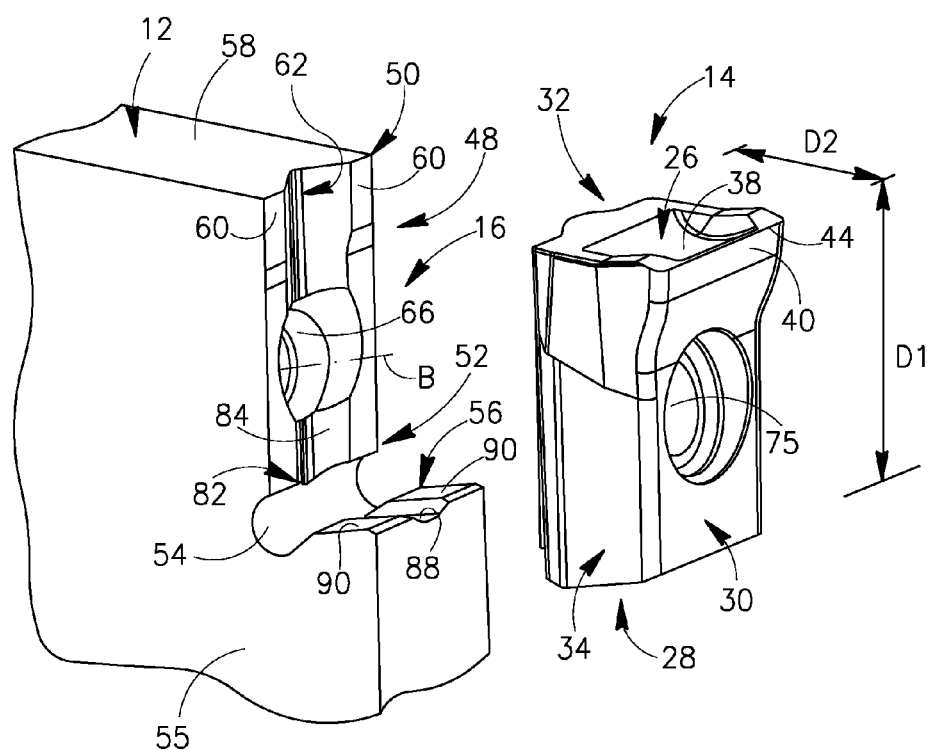
FIG. 2 is a front perspective view of the cutting portion of FIG. 1 with the cutting insert removed from its pocket.

The same applies for the corresponding recess in the rear surface of the insert pocket, i.e., the recess in the rear surface of the insert pocket does not have to be limited, as described above, to extend from the threaded bore toward the upper or the lower ends of the rear surface. It can extend, as shown in FIGS. 2 and 14, from the lower end of the rear surface to the threaded bore and from the threaded bore to the upper end of the rear surface. However, in such a case, despite the fact that an engaging element extends on both sides of the threaded bore, it may include first pocket rear abutment surfaces, as denoted by numerals 84 on FIGS. 2, 3 and 5 and numerals 384 on FIG. 14, on only one side, i.e., in a recess that extends from the threaded bore, at one side thereof, towards the near end of the pocket rear surface. In a similar manner, the same clarification applies for the cutting insert and insert pocket shown in FIGS. 10 and 11.

The engaging element of the cutting insert or the insert pocket, whether it is a protrusion or a recess, does not have to extend, as shown in the drawings, from the through bore or the threaded bore all the way to the near end. It can instead extend only for a portion of the distance between the through bore or threaded bore and the near end.

The first insert rear abutment surfaces make an insert engaging angle with each other. As already mentioned, the first insert rear abutment surfaces do not have to be planar; they may be slightly curved. When they are curved, the two first insert rear abutment surfaces are still considered to make an insert engaging angle with each other. In this instance, the angle is measured between two lines, each line being parallel to the average direction of a corresponding abutment surface. Each such line representing the average direction of a curved abutment surface can be marked in a manner similar to the dashed lines defining angle α of the first insert rear abutment surfaces 372, as seen in a cross-section of FIG. 5.

The insert rear abutment surfaces may be concave or convex. In a similar manner, the same applies to the first pocket rear abutment surfaces.

What is claimed is:
1. A cutting insert comprising:
   an insert upper surface and an insert lower surface forming insert end surfaces, and a peripheral surface extending between the insert end surfaces, the peripheral surface comprising:

opposing insert forward and rear surfaces and opposing insert side surfaces extending between the insert forward and rear surfaces, a through bore having a through bore axis (A) and extending between the insert forward and rear surfaces, a forward cutting edge formed at an intersection of the insert upper surface and the insert forward surface, and an insert engaging element formed on a first portion of the insert rear surface, the first portion being located between the through bore and a first of the insert end surfaces, the insert engaging element extending in a direction between the insert end surfaces and comprising two spaced apart first insert rear abutment surfaces;

wherein the insert engaging element is spaced apart from the opposing insert side surfaces by insert rear non-abutment surfaces; and wherein the insert engaging element comprises a protrusion that is located between the insert lower surface and the through bore.

2. The cutting insert according to claim 1, wherein the first insert rear abutment surfaces make an insert engaging angle (α) with each other.

3. The cutting insert according to claim 2, wherein the insert engaging angle (α) is obtuse.

4. A cutting insert comprising:

an insert upper surface and an insert lower surface forming insert end surfaces, and a peripheral surface extending between the insert end surfaces, the peripheral surface comprising:

opposing insert forward and rear surfaces and opposing insert side surfaces extending between the insert forward and rear surfaces, a through bore having a through bore axis (A) and extending between the insert forward and rear surfaces, a forward cutting edge formed at an intersection of the insert upper surface and the insert forward surface, and an insert engaging element formed on a first portion of the insert rear surface, the first portion being located between the through bore and a first of the insert end surfaces, the insert engaging element extending in a direction between the insert end surfaces and comprising two spaced apart first insert rear abutment surfaces, wherein the two spaced apart first insert rear abutment surfaces are co-planar.

5. A cutting insert comprising:

an insert upper surface and an insert lower surface forming insert end surfaces, and a peripheral surface extending between the insert end surfaces, the peripheral surface comprising:

opposing insert forward and rear surfaces and opposing insert side surfaces extending between the insert forward and rear surfaces, a through bore having a through bore axis (A) and extending between the insert forward and rear surfaces, a forward cutting edge formed at an intersection of the insert upper surface and the insert forward surface, and an insert engaging element formed on a first portion of the insert rear surface, the first portion being located between the through bore and a first of the insert end surfaces, the insert engaging element extending in a direction between the insert end surfaces and comprising two spaced apart first insert rear abutment surfaces;

wherein the insert engaging element is spaced apart from the opposing insert side surfaces by insert rear non-abutment surfaces; and wherein the insert engaging element comprises a protrusion that is located between the insert upper surface and the through bore.

6. A cutting insert comprising:

an insert upper surface and an insert lower surface forming insert end surfaces, and a peripheral surface extending between the insert end surfaces, the peripheral surface comprising:

opposing insert forward and rear surfaces and opposing insert side surfaces extending between the insert forward and rear surfaces, a through bore having a through bore axis (A) and extending between the insert forward and rear surfaces, a forward cutting edge formed at an intersection of the insert upper surface and the insert forward surface, and an insert engaging element formed on a first portion of the insert rear surface, the first portion being located between the through bore and a first of the insert end surfaces, the insert engaging element extending in a direction between the insert end surfaces and comprising two spaced apart first insert rear abutment surfaces;

wherein the insert engaging element is spaced apart from the opposing insert side surfaces by insert rear non-abutment surfaces; and wherein the insert engaging element comprises a recess that is located between the insert lower surface and the through bore.

7. A cutting insert comprising:

an insert upper surface and an insert lower surface forming insert end surfaces, and a peripheral surface extending between the insert end surfaces, the peripheral surface comprising:

opposing insert forward and rear surfaces and opposing insert side surfaces extending between the insert forward and rear surfaces, a through bore having a through bore axis (A) and extending between the insert forward and rear surfaces, a forward cutting edge formed at an intersection of the insert upper surface and the insert forward surface, and an insert engaging element formed on a first portion of the insert rear surface, the first portion being located between the through bore and a first of the insert end surfaces, the insert engaging element extending in a direction between the insert end surfaces and comprising two spaced apart first insert rear abutment surfaces;

wherein the insert engaging element is spaced apart from the opposing insert side surfaces by insert rear non-abutment surfaces; and wherein the insert engaging element comprises a recess that is located between the insert upper surface and the through bore.

8. The cutting insert according to claim 1, wherein the cutting insert comprises two spaced apart second insert rear abutment surfaces at a second portion of the insert rear surface, the first and second portions of the insert rear surface being separated by the through bore.

9. The cutting insert according to claim 8, wherein the insert lower surface comprises two spaced apart insert lower abutment surfaces.

10. A cutting insert comprising:
an insert upper surface and an insert lower surface forming insert end surfaces, and a peripheral surface extending between the insert end surfaces, the peripheral surface comprising:
opposing insert forward and rear surfaces and opposing insert side surfaces extending between the insert forward and rear surfaces,
a through bore having a through bore axis (A) and extending between the insert forward and rear surfaces,
a forward cutting edge formed at an intersection of the insert upper surface and the insert forward surface, and
an insert engaging element formed on a first portion of the insert rear surface, the first portion being located between the through bore and a first of the insert end surfaces, the insert engaging element extending in a direction between the insert end surfaces and comprising two spaced apart first insert rear abutment surfaces;
wherein the cutting insert comprises two spaced apart second insert rear abutment surfaces at a second portion of the insert rear surface, the first and second portions of the insert rear surface being separated by the through bore; and
wherein the two spaced apart second insert rear abutment surfaces are co-planar.

11. A cutting insert comprising:
an insert upper surface and an insert lower surface forming insert end surfaces, and a peripheral surface extending between the insert end surfaces, the peripheral surface comprising:
opposing insert forward and rear surfaces and opposing insert side surfaces extending between the insert forward and rear surfaces,
a through bore having a through bore axis (A) and extending between the insert forward and rear surfaces,
a forward cutting edge formed at an intersection of the insert upper surface and the insert forward surface, and
an insert engaging element formed on a first portion of the insert rear surface, the first portion being located between the through bore and a first of the insert end surfaces, the insert engaging element extending in a direction between the insert end surfaces and comprising two spaced apart first insert rear abutment surfaces;
wherein the insert lower surface comprises two spaced apart insert lower abutment surfaces; and
wherein the two spaced apart insert lower abutment surfaces are co-planar.

12. The cutting insert according to claim 1, wherein the through bore axis (A) makes an acute insert axis angle ($\theta$) with the insert rear surface, in a side cross-section of the cutting insert.

13. The cutting insert according to claim 1, wherein the insert lower surface makes an acute insert base angle ($\phi$) with the insert rear surface, in a side cross-section of the cutting insert.

14. The cutting insert according to claim 1, wherein:
the insert upper surface comprises a rake surface;
the insert forward surface comprises a forward relief surface; and
the forward cutting edge is formed at an intersection of the rake surface and the forward relief surface.

15. The cutting insert according to claim 1, wherein:
the insert forward surface comprises a rake surface;
the insert upper surface comprises a forward relief surface; and
the forward cutting edge is formed at an intersection of the rake surface and the forward relief surface.

16. A cutting tool comprising:
an insert holder comprising:
an insert pocket, the insert pocket comprising a pocket rear surface, a pocket lower surface adjacent the pocket rear surface and a threaded bore extending rearwardly from the pocket rear surface and having a threaded bore axis (B),
the pocket rear surface having a pocket first end and a pocket second end remote from the pocket first end, the pocket first and second ends are located at opposite sides of the threaded bore in a direction from the pocket lower surface to the threaded bore, wherein
the pocket rear surface comprises at the pocket first end thereof, a pocket engaging element that extends in a direction from the pocket first end to the pocket second end, the pocket engaging element comprising two spaced apart first pocket rear abutment surfaces, and
a cutting insert comprising:
an insert upper surface and an insert lower surface forming insert end surfaces, and a peripheral surface extending between the insert end surfaces, the peripheral surface comprising:
opposing insert forward and rear surfaces and opposing insert side surfaces extending between the insert forward and rear surfaces,
a through bore having a through bore axis (A) and extending between the insert forward and rear surfaces,
a forward cutting edge formed at an intersection of the insert upper surface and the insert forward surface, and
an insert engaging element formed on a first portion of the insert rear surface, the first portion being located between the through bore and a first of the insert end surfaces, the insert engaging element extending in a direction between the insert end surfaces and comprising two spaced apart first insert rear abutment surfaces;
wherein:
the cutting insert is seated in the insert pocket of the insert holder and retained by a retaining screw; and
the first insert rear abutment surfaces abut the first pocket rear abutment surfaces.

17. The cutting tool according to claim 16, wherein:
the first insert rear abutment surfaces make an insert engaging angle ($\alpha$) with each other; and
the first pocket rear abutment surfaces make a pocket engaging angle ($\beta$) with each other.

18. The cutting tool according to claim 17, wherein:
the insert engaging angle ($\alpha$) is obtuse;
the pocket engaging angle ($\beta$) is obtuse.

19. The cutting tool according to claim 16, wherein:
the insert engaging element is spaced apart from the insert side surfaces by insert rear non-abutment surfaces;
the pocket engaging element is spaced apart from insert holder side surfaces by pocket rear non-abutment surfaces; and the insert rear non-abutment surfaces oppose and are spaced apart from the pocket rear non-abutment surfaces.

20. The cutting tool according to claim 19, wherein:
the insert engaging element comprises a protrusion; and
the pocket engaging element comprises a recess.

21. The cutting tool according to claim 19, wherein:
the insert engaging element comprises a recess; and
the pocket engaging element comprises a protrusion.

22. The cutting tool according to claim 16, wherein:
the insert rear surface comprises two spaced apart second insert rear abutment surfaces located between the through bore and a second of the insert end surfaces;
the pocket rear surface comprises two spaced apart second pocket rear abutment surfaces located on the pocket second end; and
the second insert rear abutment surfaces abut the second pocket rear abutment surfaces.

23. The cutting tool according to claim 22, wherein:
the second insert rear abutment surfaces are co-planar; and
the second pocket rear abutment surfaces are co-planar.

24. The cutting tool according to claim 19, wherein:
the pocket lower surface comprises two spaced apart pocket lower abutment surfaces;
the insert lower surface comprises two spaced apart insert lower abutment surfaces; and
the insert lower abutment surfaces abut the pocket lower abutment surfaces.

25. The cutting tool according to claim 24, wherein:
the pocket lower abutment surfaces are co-planar; and
the insert lower abutment surfaces are co-planar.

26. The cutting tool according to claim 24, wherein:
the insert rear surface comprises two spaced apart second insert rear abutment surfaces located between the through bore and a second of the insert end surfaces;
the pocket rear surface comprises two spaced apart second pocket rear abutment surfaces located on the pocket second end; and
the second insert rear abutment surfaces abut the second pocket rear abutment surfaces.

27. The cutting tool according to claim 24, wherein the pocket lower abutment surfaces make an acute pocket base angle ($\gamma$) with the pocket rear surface, in a side cross-section of the insert pocket.

28. The cutting tool according to claim 16, wherein:
the through bore axis (A) makes an acute insert axis angle ($\theta$) with the insert rear surface, in a side cross-section of the cutting insert; and
the threaded bore axis (B) makes an acute threaded bore angle ($\delta$) with the pocket rear surface, in a side cross-section of the insert pocket.

29. The cutting tool according to claim 16, wherein the insert holder is a part of a rotary slot metal cutting tool.

30. The cutting tool according to claim 16, wherein the insert holder is a part of a rectangular blade.

31. A cutting tool comprising:
an insert holder having an insert pocket, a cutting insert seated in the insert pocket and a retaining screw, the cutting insert comprising:
an insert upper surface and an insert lower surface forming insert end surfaces, and a peripheral surface extending between the insert end surfaces, the peripheral surface comprising:
opposing insert forward and rear surfaces and opposing insert side surfaces extending between the insert forward and rear surfaces,
a through bore having a through bore axis (A) and extending between the insert forward and rear surfaces,
a forward cutting edge formed at an intersection of the insert upper surface and the insert forward surface,
an insert engaging element formed on a first portion of the insert rear surface, the first portion being located between the through bore and a first of the insert end surfaces, the insert engaging element extending in a direction between the end surfaces and comprising two spaced apart first insert rear abutment surfaces, and
two spaced apart second insert rear abutment surfaces formed on the second end of the insert rear surface,
the insert lower surface comprising two spaced apart insert lower abutment surfaces,
the insert pocket comprising a pocket rear surface, a pocket lower surface adjacent the pocket rear surface and a threaded bore extending rearwardly from the pocket rear surface and having a threaded bore axis (B),
the pocket rear surface having a pocket first end and a pocket second end remote from the pocket first end, the pocket first and second ends are located at opposite sides of the threaded bore in a direction from the pocket lower surface to the threaded bore,
the pocket rear surface comprising at the pocket first end thereof a pocket engaging element that extends in a direction from the pocket first end to the pocket second end, the pocket engaging element comprising two spaced apart first pocket rear abutment surfaces,
the second end of the pocket rear surface comprising two spaced apart second pocket rear abutment surfaces,
the pocket lower surface comprising two spaced apart pocket lower abutment surfaces, wherein:
the retaining screw passes through the through bore of the cutting insert and threadingly engaging into the threaded bore, the first insert rear abutment surfaces abut the first pocket rear abutment surfaces, the second insert rear abutment surfaces abut the second pocket rear abutment surfaces, and, the insert lower abutment surfaces abut the pocket lower abutment surfaces.

32. The cutting insert according to claim 10, wherein the insert engaging element comprises a protrusion that is located between the insert lower surface and the through bore.

33. The cutting insert according to claim 10, wherein the insert engaging element comprises a protrusion that is located between the insert upper surface and the through bore.

34. The cutting insert according to claim 11, wherein:
the cutting insert further comprises two spaced apart second insert rear abutment surfaces at a second portion of the insert rear surface, the first and second portions of the insert rear surface being separated by the through bore; and
the insert engaging element comprises a protrusion that is located between the insert lower surface and the through bore.

35. The cutting insert according to claim 11, wherein:
the cutting insert further comprises two spaced apart second insert rear abutment surfaces at a second portion of the insert rear surface, the first and second portions of the insert rear surface being separated by the through bore; and
the insert engaging element comprises a protrusion that is located between the insert upper surface and the through bore.

* * * * *